United States Patent [19]

Swierski

[11] Patent Number: 5,184,406
[45] Date of Patent: Feb. 9, 1993

[54] PROJECTED LIGHT PLUMB DEVICE

[76] Inventor: Thomas Swierski, 2 Woodstock La., Middleton, N.Y. 10940

[21] Appl. No.: 716,997

[22] Filed: Jun. 18, 1991

[51] Int. Cl.⁵ .................. G01C 15/02; G01C 15/08
[52] U.S. Cl. ........................... 33/227; 33/286; 33/291; 33/378
[58] Field of Search ............... 33/227, 327, 378, 391, 33/396, 286, 290, 291, 344, 346, 275 R, 283, 282

[56] References Cited

U.S. PATENT DOCUMENTS

| | | |
|---|---|---|
| 701,612 | 6/1902 | Prier . |
| 753,445 | 3/1904 | Stratton . |
| 1,552,691 | 9/1925 | Girvin .................. 33/378 |
| 2,432,875 | 12/1947 | Flint . |
| 2,514,500 | 7/1950 | Kroener ................ 33/378 |
| 2,525,387 | 10/1950 | Volk . |
| 2,587,878 | 3/1952 | Nachtrieb ............. 33/291 |
| 3,044,173 | 7/1962 | O'Neal et al. . |
| 3,505,739 | 4/1970 | Abrams . |
| 3,772,797 | 11/1973 | Gleba .................. 33/227 |
| 3,909,952 | 10/1975 | Lagasse ............... 33/227 |
| 3,911,588 | 10/1975 | Ohneda ................ 33/286 |
| 3,911,592 | 10/1975 | Crask .................. 33/378 |
| 3,988,837 | 11/1976 | Benson ................. 33/227 |
| 4,053,239 | 10/1977 | Tolmon ................ 33/286 |
| 4,096,638 | 6/1978 | Schimming ........... 33/396 |
| 4,106,207 | 8/1978 | Boyett et al. ........ 33/286 |
| 4,206,550 | 6/1980 | Boyett et al. ........ 33/286 |
| 4,517,749 | 5/1985 | Scotto ................. 33/346 |
| 5,012,585 | 5/1991 | Di Maggio ........... 33/286 |

FOREIGN PATENT DOCUMENTS

| | | |
|---|---|---|
| 134511 | 11/1919 | United Kingdom . |
| 2016850 | 9/1979 | United Kingdom . |

*Primary Examiner*—William A. Cuchlinski, Jr.
*Assistant Examiner*—C. W. Fulton
*Attorney, Agent, or Firm*—Hoffman, Wasson & Gitler

[57] ABSTRACT

The present invention relates to projected light plumb device generally utilized in vertically aligning a floor position with a corresponding ceiling position in which a light projecting device is buoyantly supported within a fluid filled container. The light projecting device is selectively mounted on a float platform which is horizontally supported by the fluid in such a manner that regardless of the floor's inclination, the light projecting device will transmit a beam of light along a perfectly vertical line.

11 Claims, 5 Drawing Sheets

PROJECTED LIGHT PLUMB DEVICE

FIELD OF THE INVENTION

This invention relates to devices used in the construction industry to align positions on parallel surfaces.

BACKGROUND OF THE INVENTION

Within the construction industry, it is often necessary to accurately align a first position on a support surface with a vertically displaced second position. This is often accomplished by a device commonly referred to as a "plumb bob". A plumb bob generally consists of a flexible string with a weighted marker at one end. In use, the free end of the string is placed at a second position and the weighted marker is allowed to hang freely until it is settled. At this point, the marker will be pointing at a first position which is vertically aligned with the second position. This result occurs after a trial and error procedure. That is, the alignment operation concludes only after constantly moving the upper string at the second position until it ultimately points at the first position. The instant invention provides an apparatus for vertically aligning two positions without the repeated trial and error required by the earlier "plumb bob" devices.

Mechanical plumb bobs operate to vertically align two displaced positions. These aligners are presently being replaced by devices utilizing projected light sources.

In U.S Pat. Nos. 4,106,207 and 4,206,550, Boyett et al. there is disclosed point-to-point self plumbing apparatuses. These patents illustrate a process whereby alignment is created by a light source mounted within a gimbal system. The combination results in a device which accurately projects a beam of light along a vertical line. In the two devices of Boyett et al, upper and lower positions are marked by the light source as the beam is directed in two opposite directions.

Similarly, U.S. Pat. Nos. 3,505,739 and 3,911,588, issued to Abrams and Ohneda, respectively, disclose vertical alignment devices utilizing a projected light source. However, in contrast to the patents granted to Boyett et al, these patents disclose upwardly oriented light sources and downwardly directed markers. As with Boyett et al, these devices utilize gimal arrangements to achieve the necessary alignment between the markers and light sources. Gleba (U.S. Pat. No. 3,772,797) discloses an alternate arrangement to the use of a gimbal type balance. Gleba shows the use of pivotally mounted hangers to provide proper alignment in a projected light plumb device.

The patents discussed above illustrate light projected plumb devices. Their mechanical structures result in expensive and complicated devices. They require exacting specifications to produce the proper balance of their components and with these specifications come elaborate methods for utilizing the devices. The instant invention overcomes the problems associated with such mechanical devices by providing a suspension fluid for supporting the light projecting source.

Prier, in U.S. Pat. No. 701,612, discloses the use of fluid in a leveling instruments. Though Prier does disclose a fluid filled trough with a float supported therein, Prier's device is used for leveling and surveying and not for alignment. That is, a user looks through an eyepiece with cross-hairs and lines up the cross-hairs with the plumb-bob rod prior to using the device as a surveying transit. In contrast, the instant invention includes the combination of a light projecting device and a suspension fluid to vertically align a first position on a support surface with a corresponding second position on a second surface.

SUMMARY OF THE INVENTION

The Applicant has overcome the complexity, high cost factor, and other deficiencies of the prior plumb devices by providing an inexpensive, simple, and reliable device for vertically aligning a first position with a corresponding second position.

The projected light plumb device of the instant invention essentially requires only three elements: a container which retains a quantity of a suspension fluid (e.g. water, oil, etc.); a float platform buoyantly supported by the fluid within the container; and a light projecting device mounted on the float platform in such a manner so that the light projecting device will transmit a beam of light in a vertical line.

This vertical alignment is achieved because, regardless of the inclination of the surface upon which the container is placed, the forces of gravity will act upon the surface of the suspension fluid and create a smooth substantially horizontal surface upon which the float platform is supported. As a consequence of the float platform being supported on a level horizontal surface, a light projecting device which is properly mounted on the float platform will reliably and consistently project a vertically oriented beam of light.

In addition to the three basic components of the instant invention, the device is provided with a support tube that allows the light projecting device to be selectively mounted on the float platform. The support tube has a seat cut to accept the light projecting device in a horizontal position for an alternate use of horizontal alignment. Also, the device is provided with a cover for the container, which allows the float platform and the suspension fluid to be retained within the container when the device is not in use.

As can be seen from the description above, the instant invention has overcome the deficiencies of the prior art by providing a projected light plumb device with a limited number of essential parts that may be almost instantaneously assembled and put to use. It requires no technical adjustments (even on rough out of level ground conditions), and has no moving parts or complex machinery. Further, the instant invention is very economical and light, as most parts may be manufactured from rugged plastic, and may be moved with ease and simplicity.

DETAILED DESCRIPTION OF THE DRAWINGS

Figure 1:
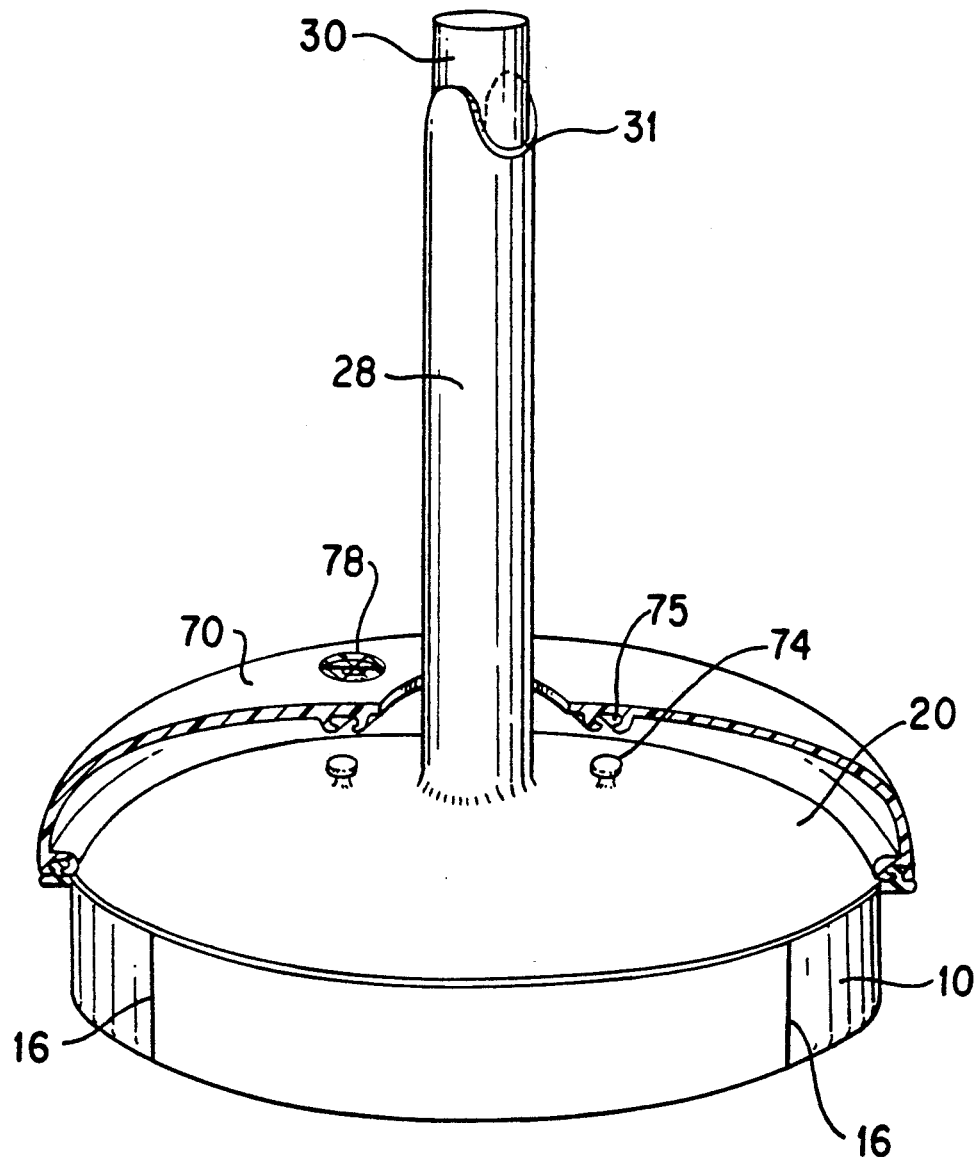
FIG. 1 is a partial, cut-away view of the projected light plumb device.
Figure 2:
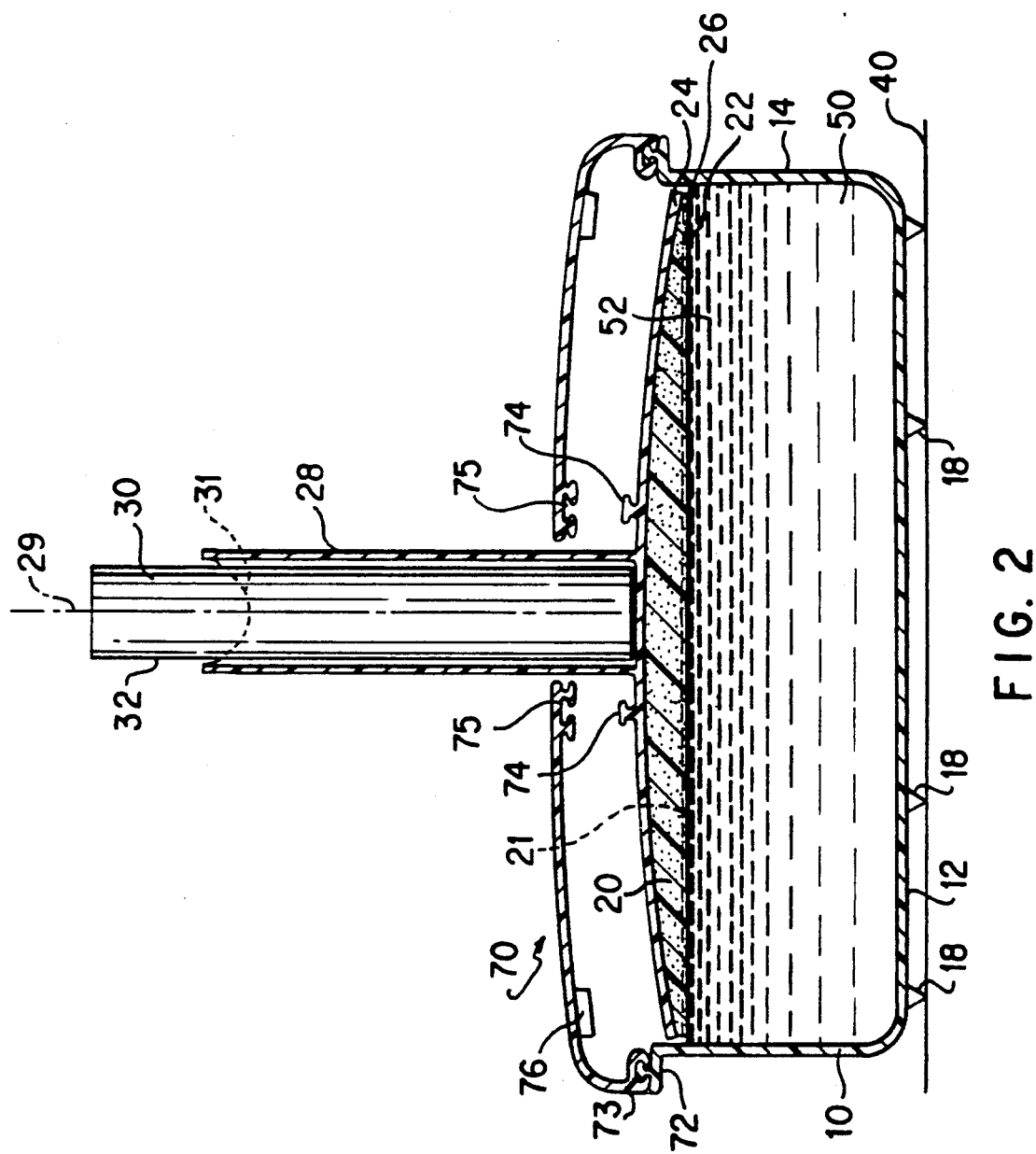
FIG. 2 is a sectional view of the device shown in FIG. 1.

With reference to FIGS. 1 and 2, the plumb device essentially includes a lower container 10, a float platform 20, and a light projecting device 30.

The lower container 10 of the preferred embodiment is constructed in a circular shape and includes a base 12 with an upwardly extending wall 14. The lower container 10 also includes a plurality of alignment markers 16 which may be utilized in properly positioning the lower container 10 on a supporting surface 40. The alignment markers 16 are positioned in quadrants about the container. In the embodiment shown in FIG. 1, the markers 16 divide the container into four equal quadrants, which allow for simple alignment on the support surface in a manner which will subsequently be discussed. To improve the stability of the lower container 10 when it is placed on rough surfaces, the lower container 10 can be provided with a plurality point setting legs attached to the base 12 of the lower container 10. The preferred embodiment utilizes three point setting legs 18.

It should be noted that although the preferred embodiment discloses the instant invention as having a circular container and four quadrants, alternate embodiments are possible which include various shapes and alignment marking arrangements.

The floating platform 20 shown in FIGS. and 2 includes a buoyant base member 22 which can be constructed from styrofoam or any similar buoyant material. Attached to the buoyant base member 22 is a cover 24 which can be constructed of molded plastic and which covers the upper surface 26 of the buoyant base member 22. As shown in the figures, the float platform 20 is a relatively thin disk-shaped member which is sized to tightly fit within the lower container 10. That is, the diameter of the float platform 20 is slightly less than the inner diameter of the lower container 10. As a result, the float platform 20 is able to freely move within the lower container 10, but is maintained in the same radial position.

Attached to the cover 24 of the float platform 20 is an upwardly extending support tube 28 which allows the light projecting device 30 to be selectively mounted on the float platform 20. In the preferred embodiment, the support tube 28 is integrally molded with the cover 24, although alternate embodiments might utilize other methods for attaching the support tube 28 and the molded cover 24.

It is critical to the proper functioning of the invention that the support tube 28 be attached to the float platform 20 in such a way that the light projecting device 30 transmits a beam of light 60 in a line perpendicular to the surface 52 of the suspension fluid 50 within the lower container 10. That is, the light beam 60 should be directed in a vertical line. This is achieved by perpendicularly aligning the central longitudinal axis 29 of the support tube 28 with the plane defining the float platform's center of buoyancy 21. When both the float platform 20 and the fluid 50 are settled, the center of buoyancy 21 corresponds to the line dividing the portion of the float platform which remains above the suspension fluid from the portion of the float platform which is submerged in the suspension fluid. Consequently, if the center of buoyancy 21 and the central longitudinal axis 29 of the support tube 28 are properly aligned, the central longitudinal axis 29 of the support tube extends in a perfect vertical line when the plumb device is in use. In the embodiments shown in the drawings, the float platform 20 is disk shaped. As a result, the center of buoyancy 21 is parallel to the lower surface of buoyant base member 22 and the horizontal surface of cover 24. It should, however, be noted that the float platform 20 may be made in various shapes where the center of buoyancy is not parallel with the surfaces of the cover and base member.

The light projecting device 30 has a cylindrical tubular body 32 which fits into the support tube 28 such that there is a limited degree of movement allowed between the light projecting device 30 and the support tube 28. Preferably, the only possible movement should allow the light projecting device to be selectively inserted and removed from the support tube 28. That is, there should be no lateral movement when the light projecting device 30 is placed within the support tube 28.

The light beam 60 is produced by an adjustable focus battery light source contained within the light projecting device. The light source can include a double cross filament bulb and a double convex lens (not shown). Although this is a preferred light source, it is understood that any light source with sufficient resolution and power would be sufficient for the purposes of this invention.

Figure 4:
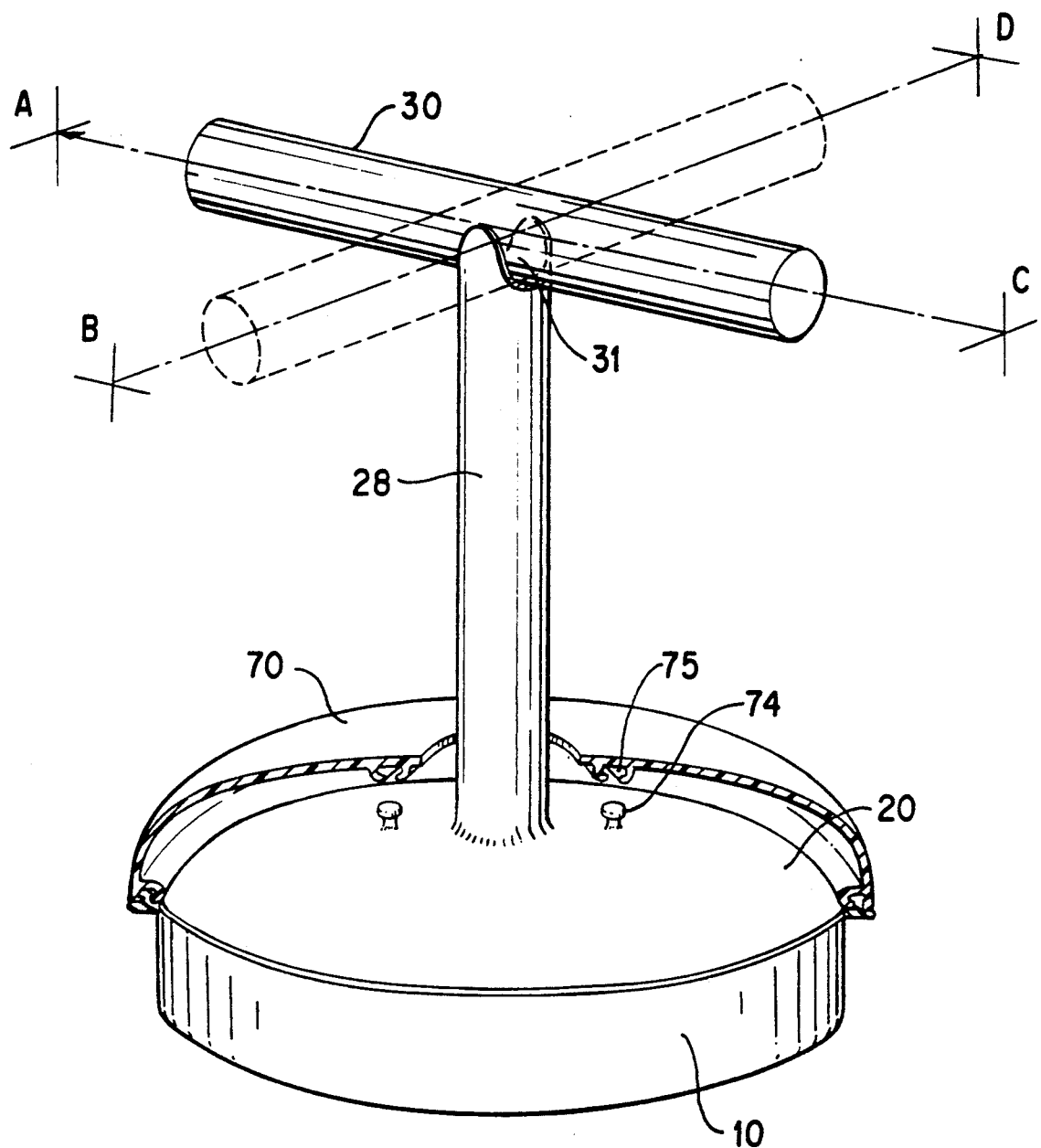
FIG. 4 is a partial cut-away view of the projected light plumb device in its alternate arrangement.

In addition to its use for vertically aligning two positions, the instant invention may be used to horizontally align a series of points (see FIG. 4). In its alternate use, the light projecting device 30 is horizontally supported within the seat cut 31. The plumb device is then positioned at a desired height and, when the float platform 20 is settled, a position A is marked on a surface. The float platform 20 is then rotated and positions B, C, D, etc. are subsequently marked in the same manner as position A. As a result of this alternate use, positions A, B, C and D will be at the same horizontal elevation; any intermediate points will also be at the same elevation. This alternative may be utilized in one man operations to establish bench elevations for setting various component systems such as concrete slabs or ceilings. Further, the alternative may be used to establish level perimeter or interior points.

It should be noted that the usefulness of the plumb device is limited by the depth of the fluid 50 in a lower container. That is, on extremely inclined support surfaces the fluid 50 will not completely support the float platform 20, and the float platform 20 will be supported on the base 12 of the lower container 10. As a result, it may be desirable to provide lower containers of variable depths for use under different circumstances.

Figure 5:
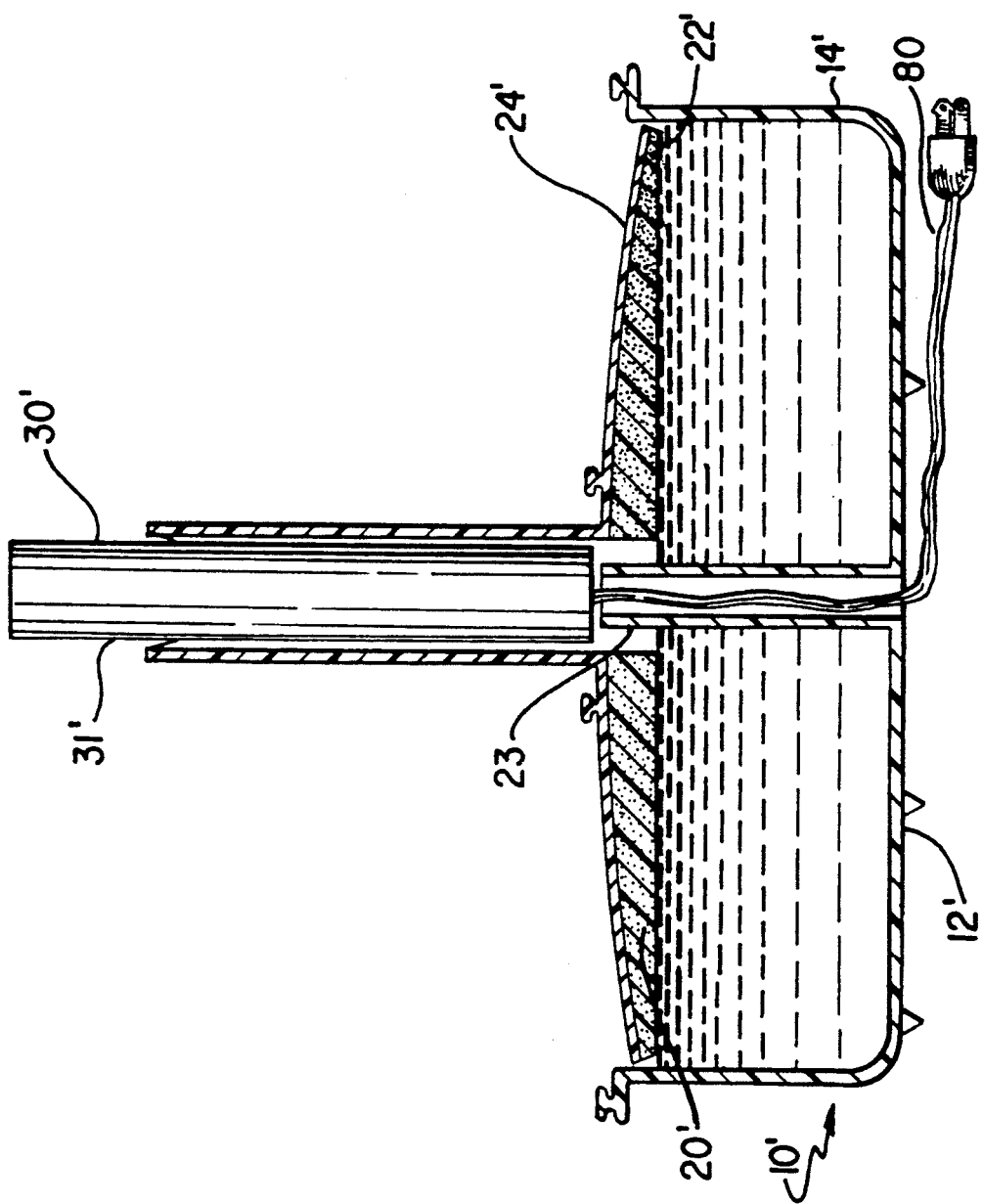
FIG. 5 is a sectional view of an alternate embodiment of the projected light plumb device.

As previously discussed, the preferred embodiment of the instant invention includes a light projecting device 30 powered by batteries stored within tubular body 32. However, FIG. 5 shows an alternate embodiment wherein the light projecting device is powered by an external power source (e.g. generator, electrical socket in wall, etc.). In this embodiment, an electrical cord 80 (e.g. very light gauge wire) is connected to the light projecting device 30' to supply energy for the light source. The cord 80 is connected to the light projecting device C' 30' by passing it through a column 15 located in the center of the lower container 10'. The column 15 extends upwardly from a hole 13 contained in base 12 and is long enough to prevent the suspension fluid from spilling into the cavity formed by the column 15.

In addition to the column 15 in the lower container 10', the float platform 20' includes a centrally located hole 23 which extends through the buoyant base member 22' and the cover 24'.

The instant invention further includes a storage cover 70 as shown in FIG. 2. The storage cover 70 is used to keep dirt and other debris out of the container. It is attached to the lower container 10 by male and female locking lugs 72 and 73, respectively, and to the float platform 20 by male and female locking lugs 74 and 75, respectively. In addition, a flexible rubber seal ring 76 is provided on the inner surface of the storage cover 70. The storage cover 70 may also be provided with a surface level 78 to determine the inclination of the support surface 40.

It should finally be noted that the lower container 10, cover 24, support tube 28, light projecting cylinder 32, and dirt cover 70 are preferably manufactured from rugged plastic, although any suitable materials would be acceptable.

Figure 3:
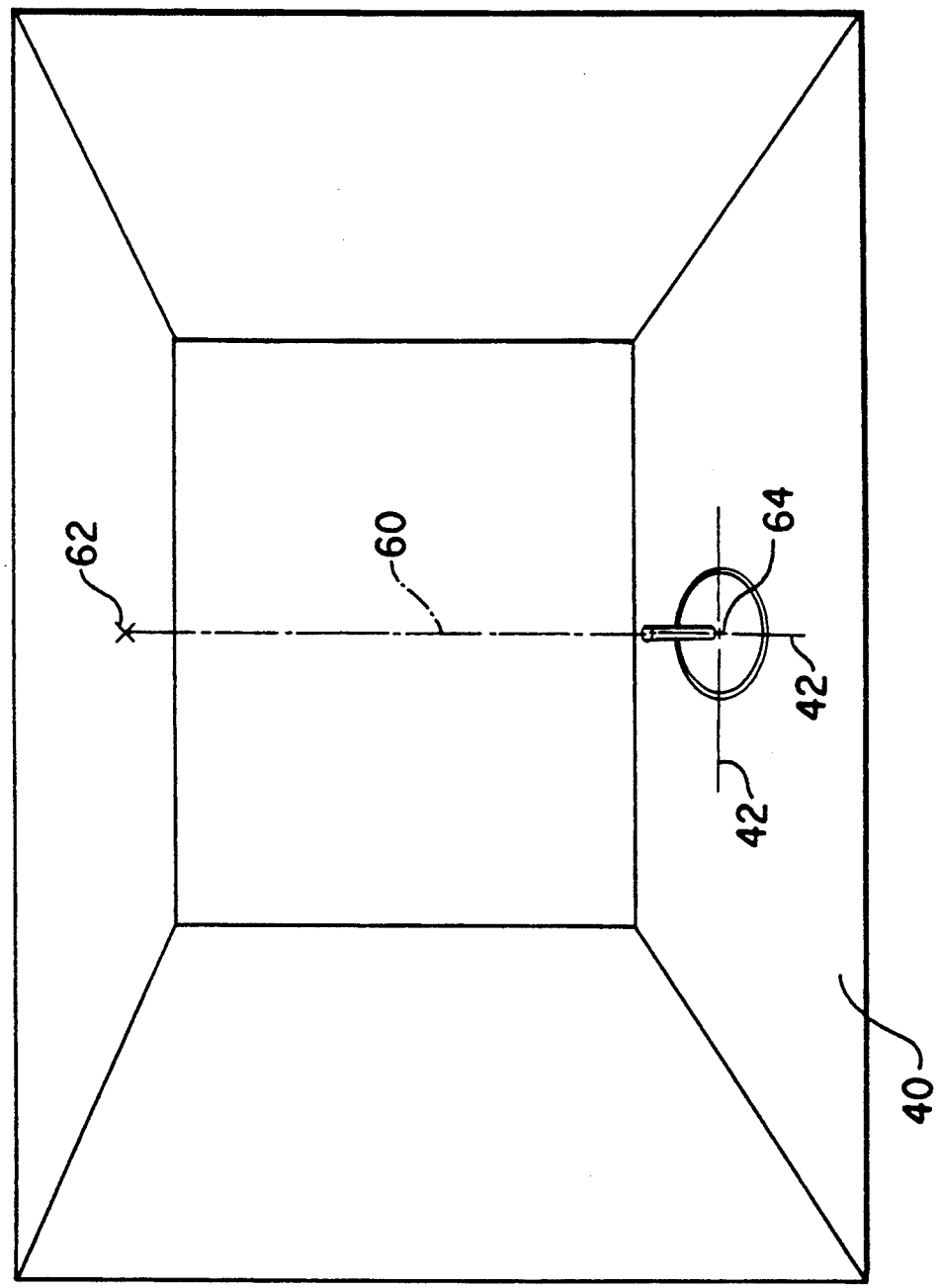
FIG. 3 is a perspective view of the instant invention in use.

In use, the support surface 40 is first marked as shown in FIG. 3 with perpendicular square lines 42 that correspond with the quadrant alignment markings 16 on the lower container 10. Next, the fluid filled lower container 10 is placed in position on the support surface by aligning the square lines 42 on the support surface with the alignment markings 16 on the lower container. Finally, the float platform 20 is allowed to settle on the suspension fluid 50. Once the float platform has settled, the activated light projecting device 30 will transmit a beam of light 60 to a second position 62 vertically aligned with the first position 64 on the support surface 40. The second position 64 will be marked and the alignment process is complete.

It should be noted that, although the preferred use of this device is to transfer a point from the support surface 40 to an upper second surface position, the device could be used with minimum trial and error to transpose a point from an upper surface to a lower support surface. This is accomplished by moving the plumb device until it is aligned with the upper point and then marking quadrant points on the support surface. Finally, the quadrant points are connected by crosslines and the intersection is the desired point corresponding to the upper point.

This invention has been shown and described in its preferred form only, and many variations are possible that would still be in the spirit of the invention. It is understood, therefore, that the invention is not limited to any specific form or embodiment except insofar as such limitations are included in the appended claims.

I claim:

1. A projected light plumb device comprising:
    a container,
    a float platform buoyantly supported within said container by a fluid suspension means,
    a light projecting device, and
    a support means for securing said light projecting device to said float platform at a predetermined angular orientation,
    wherein said container includes aligning means such that the light projecting device will transmit a beam of light to align a first position designated by said aligning means and a second position designated by said light projecting device.

2. A projected light plumb device according to claim 1, wherein the light projecting device will transmit a beam of light upwardly to vertically align said first position with said corresponding second position.

3. A projected light plumb device according to claim 1, wherein said float platform is horizontally supported by said suspension means.

4. A projected light plumb device according to claim 3, wherein said support means is a tube connected to said float platform, and said light projecting device is cylindrical such that said light projecting device may be selectively positioned within said support means.

5. A projected light plumb device according to claim 1, wherein said float platform has a center of buoyancy, and
    said support means joins said light projecting device with said float platform such that said light projecting device transmits a beam of light in a direction perpendicular to said center of buoyancy.

6. A projected light plumb device according to claim 1, wherein said support means selectively secures the light projecting device and the float platform.

7. A projected light plumb device according to claim 1, wherein said aligning means comprises a plurality of alignment markings for properly positioning the container at said first position.

8. A projected light plumb device according to claim 1, wherein the light projecting device transmits a beam of light in a horizontal plane to horizontally align a plurality of positions.

9. A projected light plumb device according to claim 1, including a cover means for storing said float platform within said container when the light plumb device is not in use.

10. A method of vertically aligning a first position on a support surface with a second position vertically displaced from said first position comprising the steps of:
    marking said support surface with perpendicular square lines such that the square lines intersect at said first position;
    positioning a projected light plumb device over said first position, wherein said light plumb device comprises:
    a container,
    a float platform buoyantly supported within said container by a fluid suspension means,
    a light projecting device, and
    a support means for securing said light projecting device to said float platform at a predetermined angular orientation,
    wherein said container includes aligning means;
    aligning said aligning means with the square lines; and
    marking said second position which is designated by a beam of light transmitted by said light projecting device.

11. A method for horizontally aligning a series of positions comprising the steps of:
    positioning the projected light plumb device at a predetermined elevation, wherein said light plumb device comprises:
    a container,
    a float platform buoyantly supported within said container by a fluid suspension means,
    a light projecting device, and
    a support means for securing said light projecting device to said float platform at a predetermined angular orientation,
    wherein said container includes aligning means;
    marking a first position designated by said light projecting device;
    rotating said light projecting device; and
    marking a second position designated by said light projecting device.

* * * * *